June 20, 1950     L. A. PACKARD, JR     2,511,939
BATTERY OPERATED FLUORESCENT LAMP
Filed Feb. 10, 1949
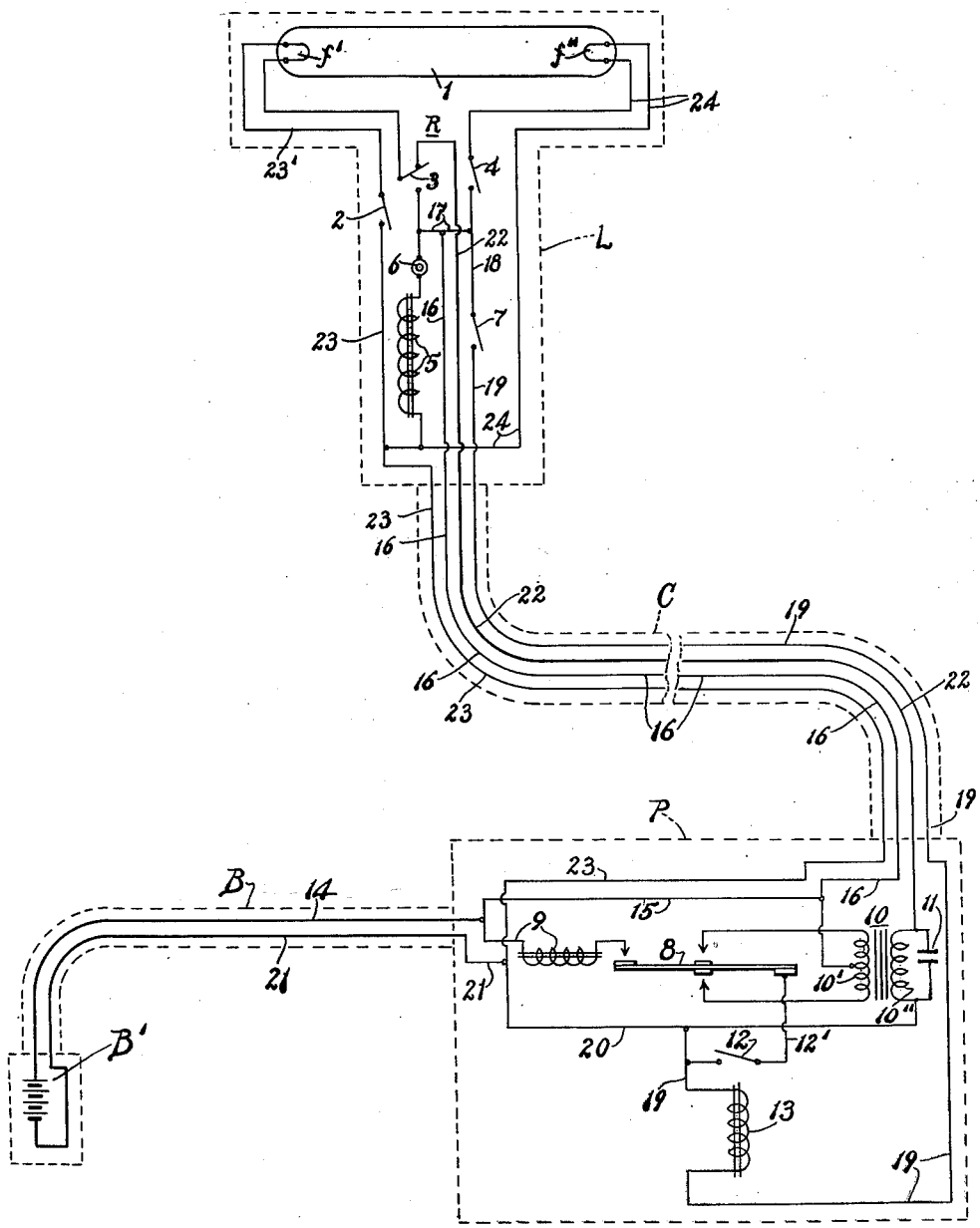
INVENTOR.
Lawrence A. Packard Jr.
ATTORNEY.

Patented June 20, 1950

2,511,939

UNITED STATES PATENT OFFICE 2,511,939

BATTERY OPERATED FLUORESCENT LAMP

Lawrence A. Packard, Jr., Glendale, Calif.

Application February 10, 1949, Serial No. 75,665

5 Claims. (Cl. 315—219)

This invention relates to battery operated fluorescent lamps, and more particularly to a portable fluorescent lamp, with a lighting system operable from a storage battery of low voltage.

The principal object of the invention is to provide, in combination with a fluorescent lamp having a gaseous conduction tube with filaments in its opposite ends, and the electric wiring system therefor, including a plurality of circuits from a battery to said lamp, a relay control circuit system which makes possible, in a simple, practical and economical manner, the successful operation of a fluorescent lamp from a low voltage battery, and with a long cable therefor, whereby said lamp can be moved from place to place in use.

By providing a multi-pole relay control as a part of the wiring system, I make possible the simple pressing of a manually operable switch to direct a low voltage circuit through the filaments in the opposite ends of said fluorescent lamp, for the purpose of heating them, and then, by the release of said switch, direct a high voltage current through said lamp, said filaments acting as electrodes.

In carrying out my improved system, I provide, in combination with a battery, and a fluorescent lamp, a power converter mechanism, including a vibrator and a transformer, and possibly a condenser, with relay controls which make possible, in a simple and practical manner, the operation of a fluorescent lamp from a battery of low voltage.

In order to illustrate and fully explain my invention, I have shown on the accompanying sheet of drawings, a diagrammatic representation of a complete wiring system embodying the invention, and have shown the different units or parts thereof separated for clearness and better understanding, as they are in actual use.

The lamp assembly is designated "L," and is shown connected by means of a four-wire cable "C," which can be most any desired length, and as long as sixty feet, with a vibrator power unit, designated "P."

Said vibrator power unit is shown connected by a relatively short two-wire cable, designated "B" with a storage battery, "B'."

The lamp assembly L, includes a gaseous conduction tube, or lamp 1, a three-pole relay "R" including three different contact levers, as 2, 3 and 4, with coil 5, a manually operable switch button 6, and a main switch 7, which can be placed in any desired location for closing a main circuit from the battery through the power converter mechanism, and for creating a high voltage current from the transformer thereof, as hereinafter again referred to.

The vibrator power unit includes a vibrator 8, with coil 9, a transformer 10, condenser 11, and a relay with contacts 12, and coil 13, and a two-wire battery connection B, to a battery B'.

The function of a condenser is to reduce sparking at vibrator contacts.

Referring now more in detail to the drawings, I will describe the various circuits making up the system, and which make possible the successful operation of a fluorescent lamp from the ordinary low voltage battery.

The main switch, designated 7, is preferably placed in the lamp assembly L. When this switch is closed, a circuit from the battery through wires 14, 15, 16, 17, 18, main switch 7, 19, relay coil 13 of the power converter, 19, 20 and 21 to the other side of the battery is closed.

With the relay coil 13 energized, the contacts 12 will be closed, and a circuit from the battery through wire 14, coil 9, vibrator 8, wire 12', contacts 12, wires 20 and 21 back to the battery will be closed.

The vibrator will now begin to vibrate and alternately apply a low voltage current across each half of the primary coil 10' of the transformer 10, through wires 14, 15, 10', 8, 12', 20 and 21.

The alternating voltage across the primary coil 10' will induce a high voltage in the secondary coil 10", of the transformer 10, which will be carried through wire 22 to the lamp assembly L, through contact 3 of a multi-pole relay, and to the left hand filament f' of the lamp 1, and back to open contact 2 of said relay.

From the other side of the secondary coil 10", through wires 20, 23 and 24, said high voltage is carried to the right hand filament f" and to open contact 4 of said multi-pole relay. No current flows because the lamp will not conduct current therethrough until the filaments are heated.

If the filament button, or switch 6, is now depressed for a few seconds, a low voltage current is passed from the battery B' through wires 14, 15, 16, 17, switch 6, relay coil 5, wires 24, 23, 21, returning to the battery. With the relay coil 5 energized, contacts 2 and 4 of the relay R will close, completing the filament circuit to f" of lamp L, and simultaneously contact 3 will open the high voltage circuit and complete the low voltage circuit to filament f'.

The high voltage circuit having been opened when the three-pole relay was energized, because the contact 3 was moved to open said high voltage circuit, and the low voltage circuits having been closed to the filaments f' and f", said filaments are heated by said low voltage current. If the filament button or switch 6 be now released, said filaments being heated, and the high voltage circuit again closed at 3, high voltage current will be applied to said lamp and light it, said filaments now acting as electrodes, the current flowing through the gaseous conduction material in said tube from one electrode to the other.

Thus, by reason of the multiple pole relay for the lamp, and the relay for the power converter, and a plurality of circuits, as described, when the main switch 7 is closed, low voltage current to the primary coil 10' will induce a high voltage current from the secondary coil of said transformer, and this high voltage current, in open circuits, will be carried through the filaments f' and f'' and to open levers 2 and 4 of said relay. Then by the simple closing of the button switch 6 for a few seconds, said high voltage current is opened at 3, and low voltage current circuits are closed at levers 2, 3 and 4, to the filaments for heating them. The release of said button switch 6 closes lever contact 3, and reestablishes high voltage circuits to said filaments, and because they are now heated, the current is carried through the lamp and it is illuminated.

I do not limit the invention to details, except as I may be limited by the hereto appended claims.

I claim:

1. A fluorescent lamp having filaments in its opposite ends and a gaseous matter therein, and means for operating it from a battery, said means including a power converter, with vibrator and transformer as a part thereof, a plurality of circuits from said battery to said power converter and said lamp, including an open circuit for low voltage current to said filaments, and an open circuit for high voltage current from said transformer to said filaments, a multi-pole relay for controlling said circuits to said lamp, a main switch for closing a circuit from said battery through said power converter for creating high voltage current therefrom to said lamp, and a manually operable switch for said multi-pole relay and operable when closed for directing a low voltage current through said lamp filaments for heating them, and for opening said high voltage circuit to said lamp, whereby, when released, said manually operable switch opens said low voltage circuit through the lamp filaments and again closes said high voltage circuit through said lamp for illuminating it.

2. The combination with a fluorescent lamp having filaments in its opposite ends, and a gaseous matter therein, a battery and a plurality of circuits from said battery to said lamp, of a power converter, including a vibrator and a transformer, connected with said battery, whereby said transformer will set up a high voltage in circuits leading to said lamp, a multi-pole relay for controlling low and high voltage currents to the filaments of said lamp, a manually operable switch for said relay and operable for first closing low voltage circuits through the filaments of said lamp for heating them and opening the high voltage circuit thereto, and when released opening the low voltage circuits and again closing the high voltage circuit, whereby, said filaments, operating as electrodes, effect the ignition of said gaseous matter in said lamp.

3. The combination with a fluorescent lamp having filaments in its opposite ends and a gaseous matter therein to be illuminated, a battery, a power converter, including a vibrator, a transformer and a condenser, and a plurality of circuits from said battery to said power converter and said lamp, of a three-pole relay control switch for said circuits to said lamp, a main switch for closing a main circuit to said power converter and said transformer, one of said circuits being connected to carry low voltage current from said battery to said filaments for heating them, a switch for closing said circuit, and another of said circuits being connected with said transformer for carrying high voltage therefrom to said filaments with control switches therefor, said relay having a manually operable switch for simultaneously closing low voltage circuits and opening high voltage circuits, alternately, whereby low voltage current heats said filaments while said switch is closed, the release of said switch operating to open said low voltage circuits and again close said high voltage circuits for directing high voltage current from said transformer through said lamp for illuminating it.

4. A fluorescent lamp having filaments in its opposite ends and a gaseous matter therein to be illuminated, and means for operating said lamp from a battery, said means including in combination a battery, a transformer for converting low voltage current into high voltage current, a vibrator, a main circuit to said transformer from said battery, with switch therefor, and a plurality of circuits from said battery to said lamp, one of said circuits being connected for carrying low voltage current to said lamp, and one of said circuits being connected with said transformer for carrying high voltage current to said lamp, and a three-pole relay control for said circuits to said lamp with a manually operable switch for said relay, said switch being operable to close circuits for low voltage current to said filaments in said lamp and to open circuits for high voltage current to said lamp, to heat said filaments, said switch, when released, closing high voltage circuits and directing high voltage current to and through said lamp, and opening the low voltage circuits.

5. A fluorescent lamp having filaments in its opposite ends and a gaseous matter therein to be illuminated, and means for operating said lamp from a battery, said means including in combination: a battery, a transformer with vibrator for converting low voltage current into high voltage current, a low voltage circuit from said battery, with switch for closing the same, a relay coil included in said low voltage circuit and energized thereby, a second low voltage circuit having a relay switch therein to be closed by said relay coil, a three-pole relay, a button switch, a third low voltage circuit including said three-pole relay and said button switch, said button switch being operable to close said third low voltage circuit through said relay, and a fourth low voltage circuit from said battery through said relay to the lamp filaments for heating them, and a high voltage circuit from said transformer to the filaments of said lamp to be completed by the release of said three-pole relay switch, whereby said lamp is illuminated by said induced high voltage current.

LAWRENCE A. PACKARD, Jr.

REFERENCES CITED

The following references are of record in the file of this patent:

UNITED STATES PATENTS

| Number | Name | Date |
|---|---|---|
| 2,057,660 | Harrington | Oct. 20, 1936 |
| 2,241,360 | Gaynor | May 6, 1941 |
| 2,319,144 | Lodge | May 11, 1943 |
| 2,396,998 | Garstang | Mar. 19, 1946 |